United States Patent [19]
Stafford et al.

[11] Patent Number: 5,892,661
[45] Date of Patent: Apr. 6, 1999

[54] SMARTCARD AND METHOD OF MAKING

[75] Inventors: John W. Stafford, Phoenix; Theodore G. Tessier, Chandler, both of Ariz.; David A. Jandzinski, Newark Valley, N.Y.

[73] Assignee: Motorola, Inc., Schaumburg, Ill.

[21] Appl. No.: 741,793

[22] Filed: Oct. 31, 1996

[51] Int. Cl.⁶ .............................. H05K 1/16; H01Q 1/36
[52] U.S. Cl. .................. 361/737; 361/748; 361/762; 343/895; 257/679
[58] Field of Search ........................... 361/728, 737, 361/748, 750, 751, 752, 760, 762, 763; 257/679; 343/700 R, 895; 235/488

[56] References Cited

U.S. PATENT DOCUMENTS

| | | | |
|---|---|---|---|
| 5,430,441 | 7/1995 | Bickley et al. | 340/825.54 |
| 5,534,372 | 7/1996 | Koshizuka et al. | 361/737 X |
| 5,597,643 | 1/1997 | Weber | 361/737 X |
| 5,633,072 | 5/1997 | Middelman et al. | 361/748 X |
| 5,640,306 | 6/1997 | Gaumet et al. | 361/737 |

*Primary Examiner*—Leo P. Picard
*Assistant Examiner*—Jayprakash N. Gandhi
*Attorney, Agent, or Firm*—Kenneth M. Seddon; Daniel R. Collopy

[57] ABSTRACT

A smartcard (10) is formed in part by a laminate layer (77). The laminate layer (77) is made up of a plurality of dielectric layers (11,30), insulating layers (45, 50), resistive layers (55), and electrically active structures. The electrically active structures include a capacitive structure (23) which is formed from one of the dielectric layers (11) and an antennae (32) which is made from a conductive layer that is formed into a spiral pattern on the another dielectric layer (30). These layers (11,30, 45, 50, 55) are formed separately and then pressed together to form the laminate layer (77).

24 Claims, 2 Drawing Sheets

5,892,661

SMARTCARD AND METHOD OF MAKING

BACKGROUND OF THE INVENTION

This invention relates, in general, to electronic components and, more particularly, to smartcards and methods of making the same.

Smartcards are electronic components that have been developed to help facilitate high volume consumer transactions. For example, smartcards are used to record the number of fares on a bus pass. When a consumer boards a bus, the smartcard is placed in a smartcard reader and one credit is deducted from the consumer's account.

One type of smartcards is known as contactless smartcards. Contactless smartcards operate by simply placing the smartcard within close proximity to a smartcard reader. Contactless smartcards do not require the smartcard to be placed in a reader so the processing of the transaction can be expedited. One application for contactless smartcards is in toll booths. Each properly equipped automobile has a contactless smartcard and, as the automobile pass through the toll booth, a smartcard reader uses radio frequency (RF) transmissions to energize the card and deduct one fare from the consumer's account.

Typical contactless smartcards contain a semiconductor device which is used to store account information and to process each transaction. Contactless smartcards also have an antennae that is formed by wrapping a wire in a spiral pattern. The RF power collected by the antennae charges a discrete capacitor to power the semiconductor device and to ensure that the smartcard operates at the proper frequency.

The addition of discrete capacitors introduces a reliability concern for smartcards. Smartcards are typically carried in wallets, purses, or pockets and can be subjected to significant physical stress. The material used to make discrete capacitors is not very flexible and can break under stress. The failure of the capacitor destroys the functionality of the smartcard, and results in the consumer's loss of the information stored on the smartcard.

By now it should be appreciated that it would be advantageous to provide a contactless smartcard that did not require the use of discrete capacitors. It would also be advantageous if the method used to form the smartcard was more economically efficient than the conventional method of forming traditional smartcards.

Figure 1:
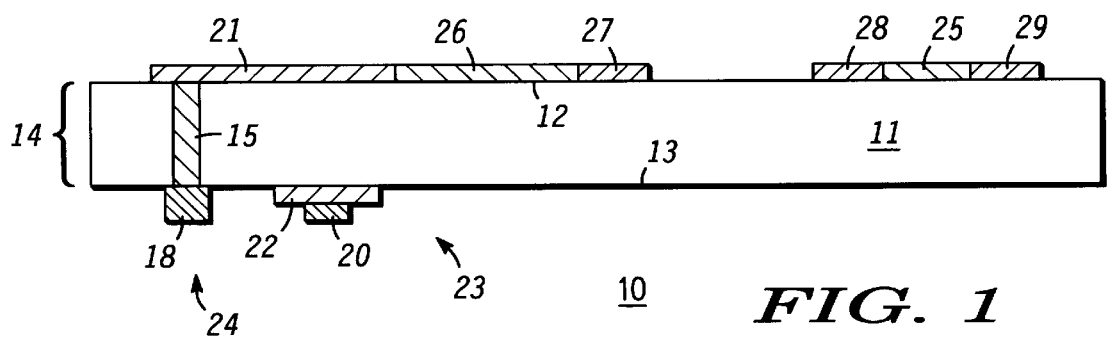
FIG. 1 is an enlarged cross-sectional view of a portion of a smartcard at an early step in a fabrication process in accordance with the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION OF THE DRAWINGS

In general, the present invention provides a novel process for forming a smartcard. A smartcard is an electronic component assembly capable of storing information pertaining to a consumer carrying the smartcard. The process described hereinbelow forms a capacitive structure as part of a laminate layer that becomes the smartcard. The smartcard comprises a sequence of individual layers that can be formed separately and then pressed together to form the laminate layer. One advantage of this process is that it obviates the need to bond discrete capacitors to the smartcard. This improves the flexibility of the smartcard, and thus, the reliability of the smartcard.

FIG. 1 is an enlarged cross-sectional view of a smartcard 10 at an early stage in the fabrication process in accordance with the present invention. A layer of dielectric material 11, hereinafter referred to as dielectric layer 11, is used to form one of the layers in a laminate structure that becomes smartcard 10. Dielectric layer 11 provides the dielectric material of a capacitor structure 23 that replaces conventional discrete capacitors. Dielectric layer 11 also acts as a substrate upon which other structures and layers are formed. Preferably, dielectric layer 11 has a dielectric constant ranging from about 3 to 30 and is formed using materials such as polytetrafluoroethylene, epoxy glass materials, polyimide, quartz, kevlar, liquid crystal polymer (LCP) or the like. The dielectric constant of the material used to provide dielectric layer 11 can be adjusted by adding a filler material such as ceramic, silica, artificial diamond, or the like. Dielectric layer 11 has a thickness 14, which is used to adjust the electrical characteristics of capacitive structure 23. Preferably, the thickness 14 of dielectric layer 11 ranges from about 50 microns to 500 microns.

In the preferred embodiment, a hole 24 is drilled through dielectric layer 11 from a top surface 12 to a bottom surface 13. As will become more apparent below, hole 24 is used to provide an electrical connection through smartcard 10. Hole 24 contains a conductive material 15 such as copper, gold, nickel, aluminum, or the like using techniques such as electroplating or chemical vapor deposition.

Conductive plate 21 is formed on the top surface 12 and conductive plate 22 is formed on the bottom surface 13 of dielectric layer 11 to form capacitive structure 23. Conductive plates 21 and 22, along with bonding pads 27–29 and interconnect lines 25 and 26, are patterned from a conductive layer (not shown) formed on the top surface 12 and the bottom surface 13 of dielectric layer 11. This conductive layer can be formed using a variety of techniques such as sputtering, electroplating, chemical vapor deposition, or by spreading a thin foil film on top surface 12 and bottom surface 13. This conductive layer can be made from a variety of materials such as aluminum, copper, gold, nickel, chrome, tungsten, and can also comprise a combination of materials such as sputtered seed layer of nickel and an electroplated layer chrome and copper. The conductive layer is patterned an etched using conventional techniques such as a patterned layer of photoresist and a reactive ion etch (RIE) or wet etching process.

After the formation of conductive plates 21 and 22, bonding material 20 is formed on conductive plates 22 and bonding material 18 is formed below the opening of hole 24 so that it is in electrical contact with conductive material 15. As shown below, bonding materials 18 and 20 are used to provide electrical connection to other layers below dielectric layer 11. For example, bonding material 20 can be used to electrically connect conductive plate 22 of capacitive structure 23 to an antennae formed below dielectric layer 11. This particular example will be illustrated shortly. Preferably, bonding materials 18 and 20 are materials that form thermal compression bonds such as gold. It should be understood that other conductive materials such as nickel, solder paste, conductive epoxy, aluminum, or copper could also be used.

Figure 2:
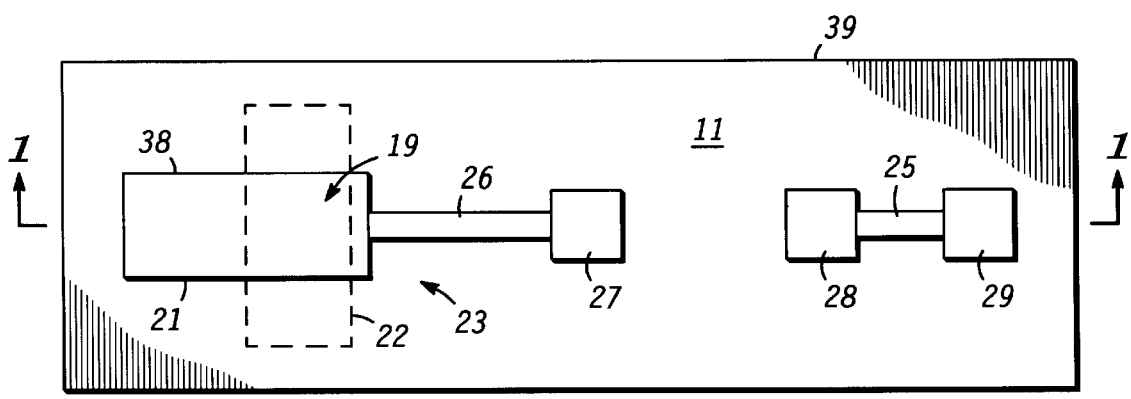
FIG. 2 is an enlarged top view of the portion of the smartcard illustrated in FIG. 1.

FIG. 2 is an enlarged top view of dielectric layer 11 and section lines 1—1 are used to indicate the view provided in FIG. 1 in relationship to that shown in FIG. 2. Bonding pads 27 and 28 are used to electrically connect an electronic component (not shown) to capacitive structure 23. The electrical connection between bonding pad 27 and conductive plate 21 is provided by interconnect line 26. Bonding pad 29 is used to electrically connect the electronic component to any structures that might be above or below dielectric layer 11. Electrical connection between the electronic component and bonding pad 29 is provided by interconnect line 25. A more detailed description of the electrical connections that are used to provide the functionality of smartcard 10 is described in more detail below.

The relative size and location of conductive plate 22 in relationship to conductive plate 21 is shown in FIG. 2 as a dashed line. The portion of conductive plate 21 that overlaps dielectric layer 11 and conductive plate 22 forms capacitive structure 23 (see FIG. 1). The overlap is shown in FIG. 2 as area 19. The effective capacitance value of capacitive structure 23 is determined by the amount of overlap (area 19), the thickness 14 of dielectric layer 11, and the dielectric constant of dielectric layer 11. It should be appreciated that all three of these variables can be adjusted to allow flexibility in the size, location, and effective capacitance value of capacitor structure 23.

As shown in FIG. 2, dielectric layer 11 also has an outer edge 39 which defines its surface area. The surface area of dielectric layer 11 depends on a number of factors such as the final size of smartcard 10 and the capacitance necessary to form capacitive structure 23. Preferably, dielectric layer 11 has a surface area of at least 1 millimeter. Conductive plate 21 also has a surface area as indicated by outer edge 38. In the preferred embodiment, dielectric layer 11 is not only used to provide dielectric material to capacitive structure 23, but is also used to provide flexibility to smartcard 10 and support for structures formed on dielectric layer 11 such as bonding pads 27 and 28. As a result, the surface area of dielectric layer 11 is greater than the surface area of conductive plate 21. It should also be understood that in some embodiments, the surface area of dielectric layer 11 can be equal to the surface area of conductive plate 21.

Figure 3:
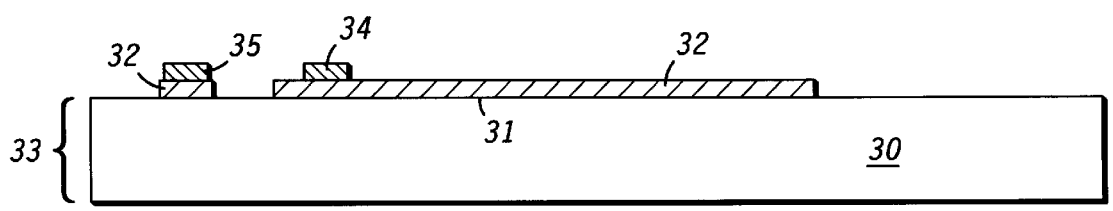
FIG. 3 is an enlarged cross-sectional view of another portion of the smartcard in accordance with the present invention.

Turning now to FIG. 3, an additional dielectric layer 30 is prepared, which is combined with dielectric layer 11 to form smartcard 10. FIG. 3 is an enlarged cross-sectional view of dielectric layer 30 which has a top surface 31 and a thickness 33, which preferably ranges from about 50 microns to 500 microns. In the preferred embodiment, dielectric layer 30 has a dielectric constant ranging from about 3 to 15 and is formed using materials such as polytetrafluoroethylene, epoxy glass materials, polyimide, liquid crystal polymers, or the like. The dielectric constant of the material used to provide dielectric layer 11 can be adjusted by adding a filler material such as ceramic, silica, artificial diamond, or the like.

An antennae structure 32, hereinafter referred to as antennae 32, is formed on a top surface 31 of dielectric layer 30. In the preferred embodiment, antennae 32 is patterned from a layer of conductive material (not shown) that is patterned into the appropriate shape so that antennae 32 can receive a radio frequency (RF) signal to provide an electrical current to smartcard 10.

One method for forming antennae 32 forms a conductive layer made from materials such as copper, nickel/gold, aluminum, or the like, which is deposited onto top surface 31 using an electroplating, sputtering, or chemical vapor deposition process. It is also possible to form the conductive layer from a sequence of layers each having a different composition. For example, sputtering a layer of copper and then using an electroplating process to form a layer of nickel. The conductive layer can also be formed by placing a thin foil of conductive material onto top surface 31.

The conductive layer is then patterned using conventional photolithographic and etch techniques as is done in the art. A mask layer (not shown), such as photoresist, is deposited onto the conductive layer. The mask layer has a pattern so that portions of the conductive layer are exposed and other portions are protected by the mask layer. An etch process is then used to remove the exposed portions of the conductive layer thus patterning the conductive layer into antennae 32. Conventional etch process such as reactive ion etching (RIE) or wet etch solutions can be used. Of course, the type of etch used depends on the composition of the conductive layer used to form antennae 32.

After the formation of antennae 32, bonding materials 34 and 35 are formed on antennae 32 to provide electrical connection to layers overlying dielectric layer 30. The placement and size of bonding materials 34 and 35 depends on the electrical connections that are required to form smartcard 10. For example, bonding materials 34 and 35 can be used to electrically couple antennae 32 to conductive plate 22 and conductive material 15 as is shown in the discussion to follow. Bonding materials 34 and 35 are preferably made from materials that readily form thermal compression bonds such as gold. It should be understood that other conductive materials such as nickel, solder paste, aluminum, conductive epoxy, or copper can be used to form bonding materials 34 and 35.

Figure 4:
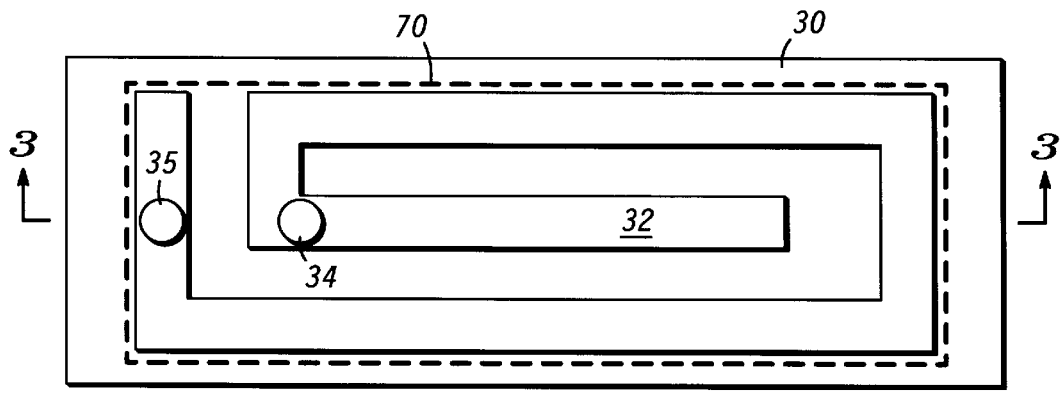
FIG. 4 is an enlarged top view of the portion of the smartcard shown in FIG. 3.

FIG. 4 is an enlarged top view of dielectric layer 30. FIG. 4 illustrates one method for patterning antennae 32 so that it can receive an RF signal. As shown, antennae preferably has a spiral pattern made of a thin conductive material that revolves around itself. As will be appreciated by one skilled in the art, the spiral configuration of antennae 32 can be varied in both pitch and number of revolutions in the spiral pattern to optimize the response antennae 32 has to a particular radio frequency. Section lines 2—2 are provided in FIG. 4 to illustrate the cross-sectional view of FIG. 3.

In FIG. 4, a dashed line 70 is used to indicate the surface area of antennae 32. All of the spiral pattern of antennae 32 is contained within the dashed line 70. In comparison to the preferred embodiment illustrated in FIG. 2, the surface area of dielectric layer 11 is greater than the surface area, dashed line 70, of antennae 32. It should also be understood that in an alternate embodiment not illustrated, the surface area of antenna 32 can be equal to the surface area of dielectric layer 11.

Figure 5:
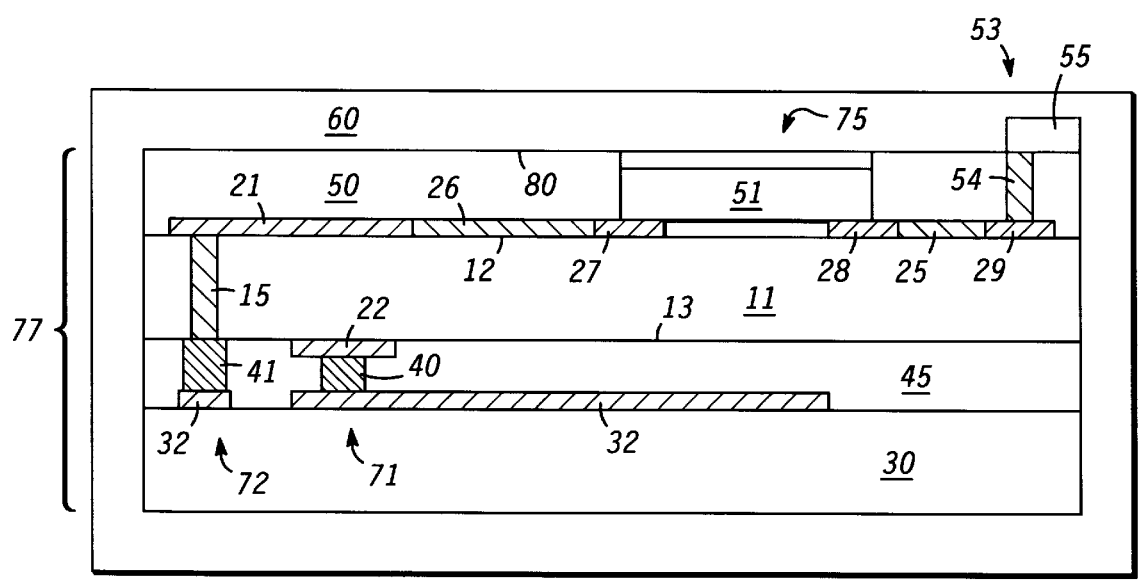
FIG. 5 is an enlarged cross-sectional view of a completed smartcard in accordance with the present invention.

FIG. 5 is an enlarged cross-sectional view of smartcard 10 after further processing. A layer of insulating material 45, such as polyimide, bondply, prepeg, unclad polytetrafluoroethylene, or the like is placed over dielectric layer 30. As shown in FIG. 5, insulating layer 45 has openings 71 and 72 to allow bonding material 34 and 35 (see FIG. 3) to pass through insulating layer 45 to electrically couple to overlying structures. Dielectric layer 11 is positioned over insulating layer 45 so that bonding material 18

(see FIG. 1) aligns with bonding material 35 and so that bonding material 20 aligns with bonding material 34.

A pressing operation is performed to permanently bond dielectric layer 30, insulating layer 45, and dielectric layer 11 together to form a portion of a laminate layer 77. One method for bonging these layers together applies a pressure ranging from about 50 pounds per square inch (PSI) to 500 PSI so dielectric layer 30 is forced towards dielectric layer 11 and vice versa. As the pressure is being applied, the layers are heated to a temperature ranging from about 400 degrees Celsius (°C.) to 800° C. for about 1 hour to 4 hours. This pressing operation allows bonding materials 20 and 34 to permanently bond and form contact 40 that passes through opening 71 in insulating layer 45 and electrically connects conductive plate 22 to antennae. Bonding materials 18 and 35 form contact 41 that passes through opening 72 in insulating layer 45 and electrically connects antennae 32 to conductive material 15, which in turn, is electrically connected to conductive plate 21.

Optionally, an additional insulating layer 50 can be bonded to the top surface 12 of dielectric layer 11 as part of laminate layer 77. Insulating layer 50 can be used to provide insulation between the conductive portions on dielectric layer 11 (i.e. conductive plate 21) and an electronic component 51. Insulating layer 50 can be made from a variety of materials such as poly vinyl chloride (PVC), thin FR-4, polyester, or polyimide depending on the electrical characteristics that are required. A similar pressing operation as described above can be used to permanently bond insulating layer 50 to dielectric layer 11. Insulating layer 50 has a cavity 75 that exposes portions of bonding pads 27 and 28, which are used to electrically connect to electronic component 51 in cavity 75.

Electronic component 51 can be a variety of devices depending of the functional requirements of smartcard 10. For example, electronic component 51 can be a semiconductor device, an integrated circuit, an optical electronic component, a microprosessor, a microcontroller, or the like. Conventional bonding techniques can be used to electrically and physically connect electronic component 51 to bonding pads 27 and 28.

As shown in FIG. 5, insulating layer 50 can have a hole 53 that is filled with a conductive material 54 to electrically connect bonding pad 29 on dielectric layer 11 to structures formed on or over the top surface 80 of insulating layer 50. In an optional and alternate embodiment, a layer of resistive material 55 such as tungsten, polysilicon, copper, aluminum, or the like is formed on top surface 80. Resistive material 55 can be used to provide a resistive element (i.e. a resistor) for the electrical operation of smartcard 10. The thickness and size of resistive material 55 is adjusted to provide the exact resistance (ohms) that is required.

To complete the formation of smartcard 10, laminate layer 77 is encapsulated in a protective coating 60. Protective coating 60 can be made from materials such as poly vinyl chloride and is used to provided protection to smartcard 10 from the environment that smartcard 10 is stored in and used in.

Smartcard 10 formed in accordance with the present invention has many advantages over conventional smartcards. First, a capacitive structure is formed that obviates the need to bond a discrete capacitor to a smartcard. By forming the capacitive structure from a flexible sheet of dielectric material, the overall flexibility of the smartcard is improved. In general, the dielectric layer used to form the capacitive structure has a modulus of elasticity of at least 0.05 to 2.5 million pounds per square inch. Compared to the modulus of elasticity of a discrete capacitor, which is typically about 22 to 53 million pounds per square inch, the present invention offers a structure that is much more flexible and thus more tolerant of stress as the smartcard is used and stored.

As illustrated in the examples provided above, capacitive structure 23 is formed on dielectric layer 11 and antennae structure 32 was formed on a separate dielectric layer 30. It should also be understood that it is possible to form an antennae structure on the same dielectric layer that is used to form the capacitive structure. This may be advantageous to reduce the number of layers that are used to form the laminate layer.

In addition, it should be understood that the present invention is not limited to the particular embodiment illustrated in FIG. 5. The placement of dielectric layer 11 relative to dielectric layer 30, insulating layer 50, and resistive material 55 is optional. It is possible to form a capacitive structure below the antennae and even to form a layer of resistive material between the capacitive structure and the antennae to provide a full complement of resistive-capacitive (RC) networks. It is also possible to form multiple capacitive structures, antennas, or resistive elements within the laminate layer to provide a smartcard having additional functionality.

The flexibility in the design and manufacturing of a smartcard in accordance with the present invention offers a significant advantage over conventional smartcards. This flexibility allows structures that might be sensitive to high temperature processing to be formed separately from layers that use high temperature processing. In sum, the present invention provides for the formation of a smartcard that is more manufacturable, reliable, and less expensive to produce then conventional smartcards.

We claim:

1. A smartcard comprising:
   a first layer of dielectric material having a top surface;
   a conductive layer overlying the top surface of the first layer of dielectric material, wherein the conductive layer has a spiral pattern;
   a second layer of dielectric material having a top surface and a bottom surface, wherein the first layer of dielectric material is overlying the second layer of dielectric material;
   a first conductive plate overlying the top surface of the second layer of dielectric material;
   a second conductive plate below the bottom surface of the second layer of dielectric material, wherein at least a portion of the first conductive plate is overlying the second conductive plate;
   an electronic component that is electrically coupled to the conductive layer; and
   wherein the first layer of dielectric material and the second layer of dielectric material provide at least a portion of a laminate layer.

2. The smartcard of claim 1 wherein the conductive layer is an antennae that is capable of receiving a radio frequency signal and the antennae provides an electric current to the electronic component.

3. The smartcard of claim 1 wherein the second layer of dielectric material has a hole passing from the top surface to the bottom surface, the hole being filled with a conductive material.

4. The smartcard of claim 3 further comprising an electrical connection between the conductive layer having a spiral pattern and the first conductive plate, wherein the conductive material in the hole in the second layer of dielectric material provides at least a portion of the electrical connection.

5. The smartcard of claim 1 wherein the second layer of dielectric material has a dielectric constant ranging from about 3 to 30.

6. The smartcard of claim 5 wherein the first layer of dielectric material has a dielectric constant of about 3 to 15.

7. The smartcard of claim 1 further comprising a layer of resistive material overlying the second layer of dielectric material, the layer of resistive material providing a resistor that is electrically coupled to the electronic component.

8. The smartcard of claim 1 wherein the second layer of dielectric material comprises a material selected from the group consisting of polytetrafluoroethylene, epoxy glass materials, polyimide, quartz, kevelar, and liquid crystal polymer.

9. The smartcard of claim 8 wherein the second layer of dielectric material includes a filler material selected from the group consisting of ceramic, silica, and artificial diamond.

10. The smartcard of claim 1 wherein both the conductive layer and the second layer of dielectric material have a surface area, and the surface area of the second layer of dielectric material is greater than or equal to the surface area of the conductive layer.

11. The smartcard of claim 1 wherein both the first conductive plate and the second layer of dielectric material have a surface area, and the surface area of the second layer of dielectric material is greater than the surface area of the first conductive plate.

12. The smartcard of claim 1 further comprising an insulating layer between the first layer of dielectric material and the second layer of dielectric material.

13. An electronic component assembly comprising:
   a layer of dielectric material having a top surface and a bottom surface;
   a first conductive plate overlying the top surface of the layer of dielectric material;
   a second conductive plate below the bottom surface of the layer of dielectric material, wherein the first conductive plate, layer of dielectric material, and the second conductive plate provide a capacitor structure;
   an electronic component;
   an antennae that is electrically coupled to the electronic component and the first conductive plate; and
   wherein the layer of dielectric material, the first conductive plate, and the second conductive plate provide at least a portion of a laminate layer.

14. The electronic component assembly of claim 13 wherein the antennae is on the top surface of the layer of dielectric material.

15. The electronic component assembly of claim 14 wherein the antennae is a layer of conductive material having a spiral pattern.

16. The electronic component assembly of claim 13 wherein the layer of dielectric material has a dielectric constant of about 3 to 30.

17. The electronic component assembly of claim 13 wherein the layer of dielectric material and the first conductive plate have a surface area, and the surface area of the layer of dielectric material is greater than the surface area of the first conductive plate.

18. A smartcard comprising:
   a first layer of dielectric material having a top surface and a bottom surface;
   a first conductive plate overlying the top surface of the first layer of dielectric material;
   a second conductive plate below the bottom surface of the first layer of dielectric material, wherein at least a portion of the first conductive plate is overlying the second conductive plate;
   a second layer of dielectric material, wherein the first layer of dielectric material is overlying the second layer of dielectric material;
   an antennae on the second layer of dielectric material;
   a layer of resistive material overlying the first layer of dielectric material;
   an electronic component, wherein the first conductive plate, the antennae, and the layer of resistive material are electrically coupled to the electronic component; and
   wherein the first layer of dielectric material and the second layer of dielectric material provide at least a portion of a laminate layer.

19. The smartcard of claim 18 wherein the first layer of dielectric material has a surface area that is greater than a surface area of the antennae.

20. The smartcard of claim 19 wherein the first layer of dielectric material has a dielectric constant ranging from about 12 to 30 and the second layer of dielectric material has a dielectric constant ranging from about 3 to 15.

21. A method of making a smartcard comprising the steps of:
   providing a first layer of dielectric material having a surface area, a top surface, and a bottom surface;
   forming a first metal layer on the top surface and the bottom surface of the first layer of dielectric material;
   patterning the first metal layer to form a first conductive plate on the top surface of the first layer of dielectric material;
   patterning the first metal layer to form a second conductive plate on the bottom surface of the first layer of dielectric material, wherein at least a portion of the first conductive plate is overlying the second conductive plate;
   providing a second layer of dielectric material having a top surface;
   forming a second metal layer on the top surface of the second layer of dielectric material;
   patterning the second metal layer to form an antennae having a spiral pattern;
   placing the first layer of dielectric material over the second layer of dielectric material; and
   pressing the first layer of dielectric material towards the second layer of dielectric material to form a laminate layer.

22. The method of claim 21 further comprising the step of placing an electronic component between the first layer of dielectric material and the second layer of dielectric component becomes part of the laminate layer.

23. The method of claim 21 further comprising the steps of:
   providing a layer of resistive material; and
   placing the layer of resistive material overlying the second layer of dielectric material prior to the step of pressing so that the layer of resistive material becomes part of the laminate layer.

24. The method of claim 21 further comprising the steps of:
   forming a hole from the top surface of the first layer of dielectric material to the bottom surface of the first layer of dielectric material; and
   forming in part an electrical connection between the antennae and the first conductive plate by filling the hole in the first layer of dielectric material with a conductive material.

* * * * *

UNITED STATES PATENT AND TRADEMARK OFFICE
CERTIFICATE OF CORRECTION

PATENT NO. : 5,892,661
DATED : April 6, 1999
INVENTOR(S) : John W. Stafford et al.

It is certified that error appears in the above-identified patent and that said Letters Patent is hereby corrected as shown below:

In column 8, claim 22, line 47, after "dielectric" insert --material prior to the step of pressing so the electronic--

Signed and Sealed this

Eighth Day of August, 2000

Attest:

Q. TODD DICKINSON

Attesting Officer

Director of Patents and Trademarks